US012562627B2

(12) United States Patent (10) Patent No.: US 12,562,627 B2
Shimizu et al. (45) Date of Patent: Feb. 24, 2026

(54) FIXING STRUCTURE OF CHOKE COIL AND MOTOR

(71) Applicant: MABUCHI MOTOR CO., LTD.,
Chiba (JP)

(72) Inventors: Satoshi Shimizu, Chiba (JP); Kosuke Morishita, Chiba (JP)

(73) Assignee: MABUCHI MOTOR CO., LTD.,
Chiba (JP)

( * ) Notice: Subject to any disclaimer, the term of this patent is extended or adjusted under 35 U.S.C. 154(b) by 218 days.

(21) Appl. No.: 18/558,190

(22) PCT Filed: Jun. 3, 2022

(86) PCT No.: PCT/JP2022/022666
§ 371 (c)(1),
(2) Date: Oct. 31, 2023

(87) PCT Pub. No.: WO2023/007949
PCT Pub. Date: Feb. 2, 2023

(65) Prior Publication Data
US 2024/0213860 A1      Jun. 27, 2024

(30) Foreign Application Priority Data
Jul. 29, 2021      (JP) ................................ 2021-123798

(51) Int. Cl.
*H02K 13/10*          (2006.01)
*H02K 13/00*          (2006.01)
(52) U.S. Cl.
CPC ........... *H02K 13/006* (2013.01); *H02K 13/10* (2013.01)
(58) Field of Classification Search
CPC .... H02K 13/006; H02K 13/10; H02K 11/026; H02K 5/14; H02K 5/143; H01F 27/06
(Continued)

(56) References Cited

U.S. PATENT DOCUMENTS

2004/0061411 A1*    4/2004    Tyshchuk ............. H02K 11/026
                                                              310/239
2013/0220291 A1*    8/2013    Lindner ............... H02K 11/026
                                                              123/568.24
(Continued)

FOREIGN PATENT DOCUMENTS

CN          201893391 U  *  7/2011
DE          10010439 A1 *  9/2001    ............. H02K 15/00
JP          5501689 B2     5/2014

OTHER PUBLICATIONS

Machine translation of CN-201893391-U. (Year: 2011).*
(Continued)

*Primary Examiner* — Michael Andrews
(74) *Attorney, Agent, or Firm* — HAUPTMAN HAM, LLP

(57)          ABSTRACT

A choke coil is mechanically fixed without using an adhesive, and a fixed state is maintained for a long period of time. A fixing structure of a choke coil electrically connected to a brush that is in sliding contact with a commutator and housing a ferrite core inside includes: a bottom surface portion where the choke coil is placed; a housing wall portion erected from the bottom surface portion and forming a first space that houses the choke coil with the bottom surface portion; an elastic portion that is formed by notching a part of the housing wall portion and capable of elastic deformation; and a pressing portion that presses the choke coil via the elastic portion by biasing the elastic portion to an inside of the first space, and fixes the choke coil between the pressing portion and the inner surface of the housing wall portion.

7 Claims, 5 Drawing Sheets

(58) Field of Classification Search
USPC ................................................ 310/238, 239
See application file for complete search history.

(56) References Cited

U.S. PATENT DOCUMENTS

2015/0076958 A1\* 3/2015 Hehn ................... H01R 39/381
310/248
2016/0294246 A1\* 10/2016 Hamagishi ............. H02K 5/148

OTHER PUBLICATIONS

Machine translation of DE-10010439-A1. (Year: 2001).\*
Office Action in JP Application No. 2023-538312 mailed Aug. 6, 2024, 8pp.
International Search Report in PCT Application No. PCT/JP2022/022666, mailed Aug. 9, 2022, 5pp.
Written Opinion in PCT Application No. PCT/JP2022/022666, mailed Aug. 9, 2022, 8pp.

\* cited by examiner

【Fig. 1】
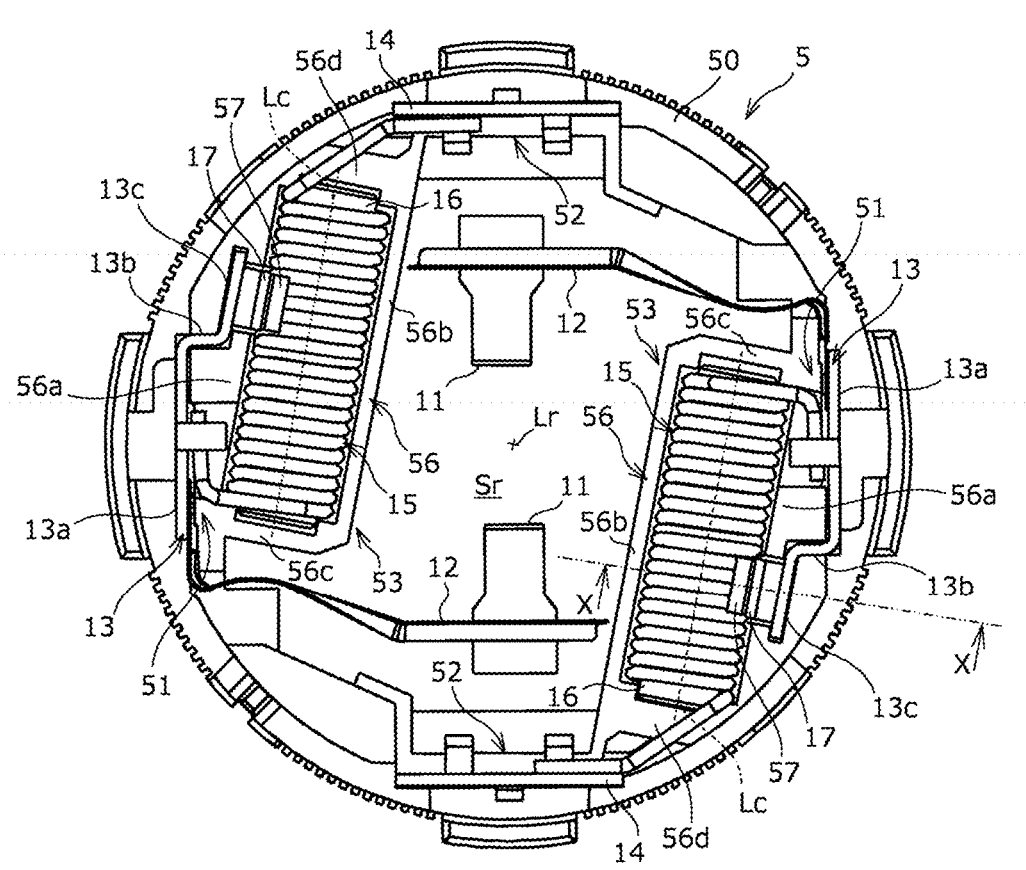
OTHER SIDE ⟷ ONE SIDE
【Fig. 2】

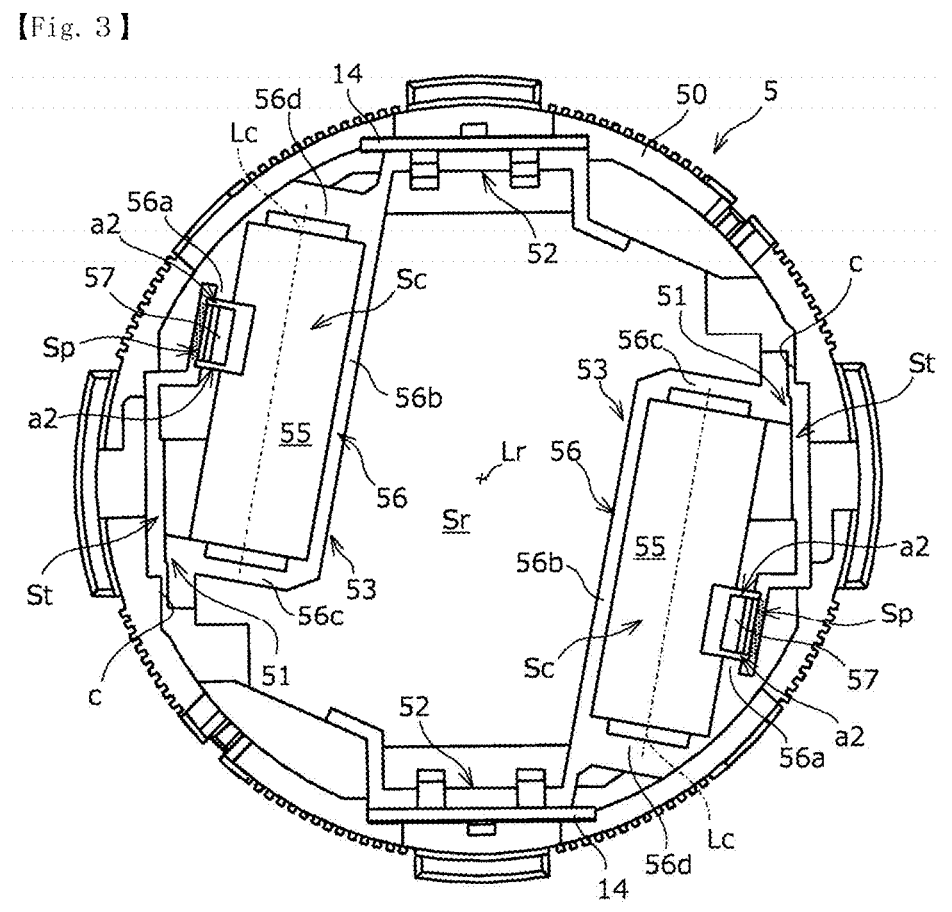

【Fig. 3】

【Fig. 4】
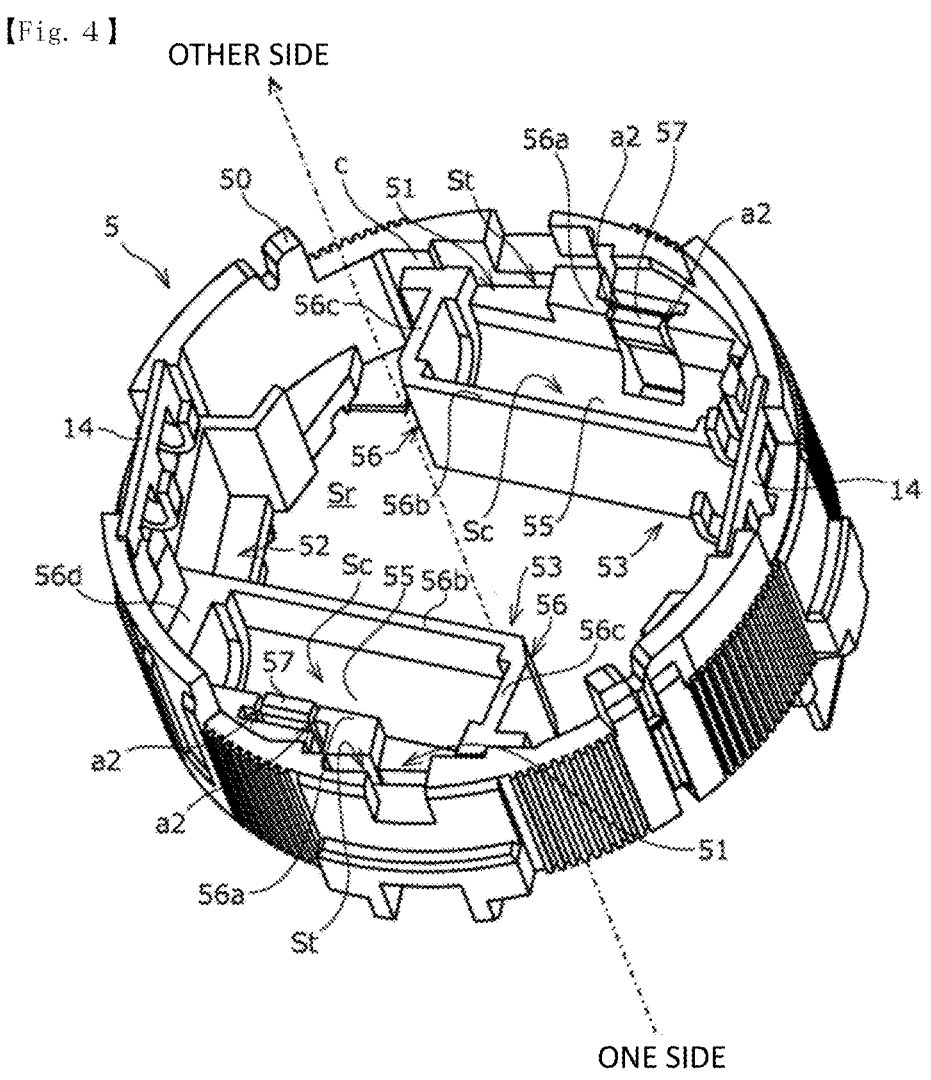

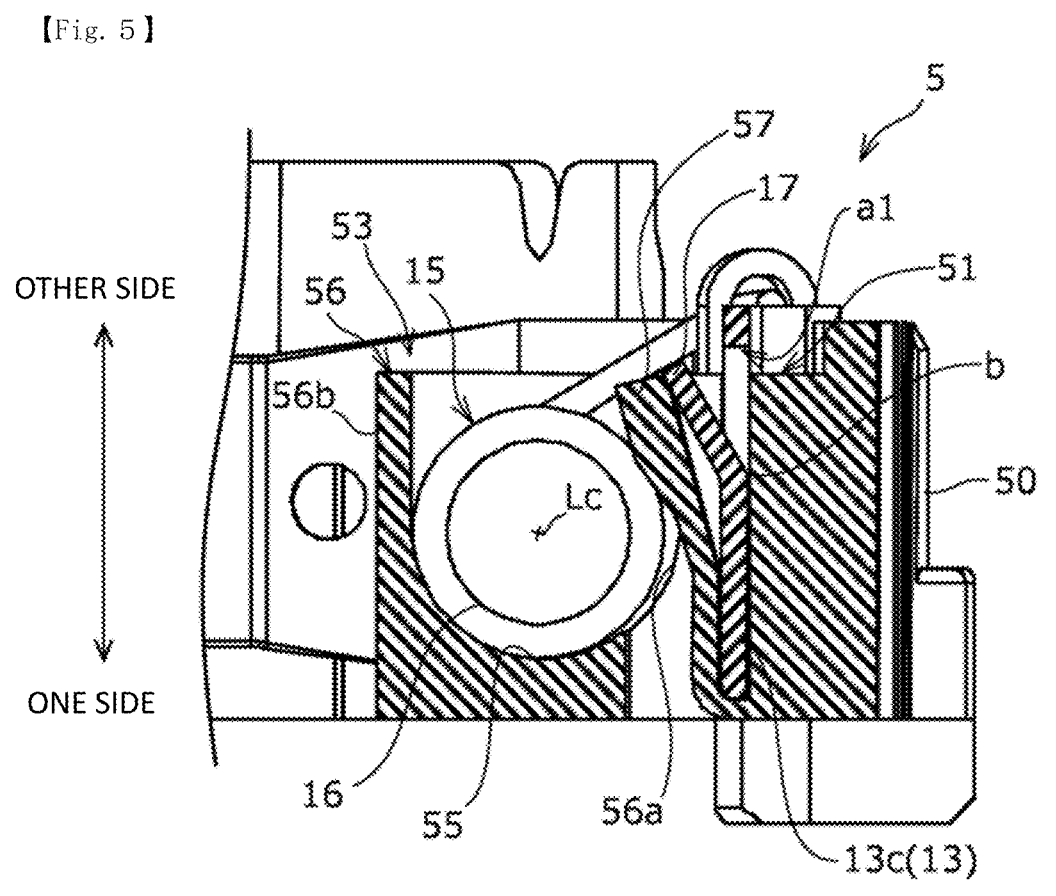

【Fig. 5】

OTHER SIDE

ONE SIDE

57

5

53

56

15

17 a1

51

56b b

Lc

50

16

55

56a

13c(13)

【Fig. 6 】
OTHER SIDE
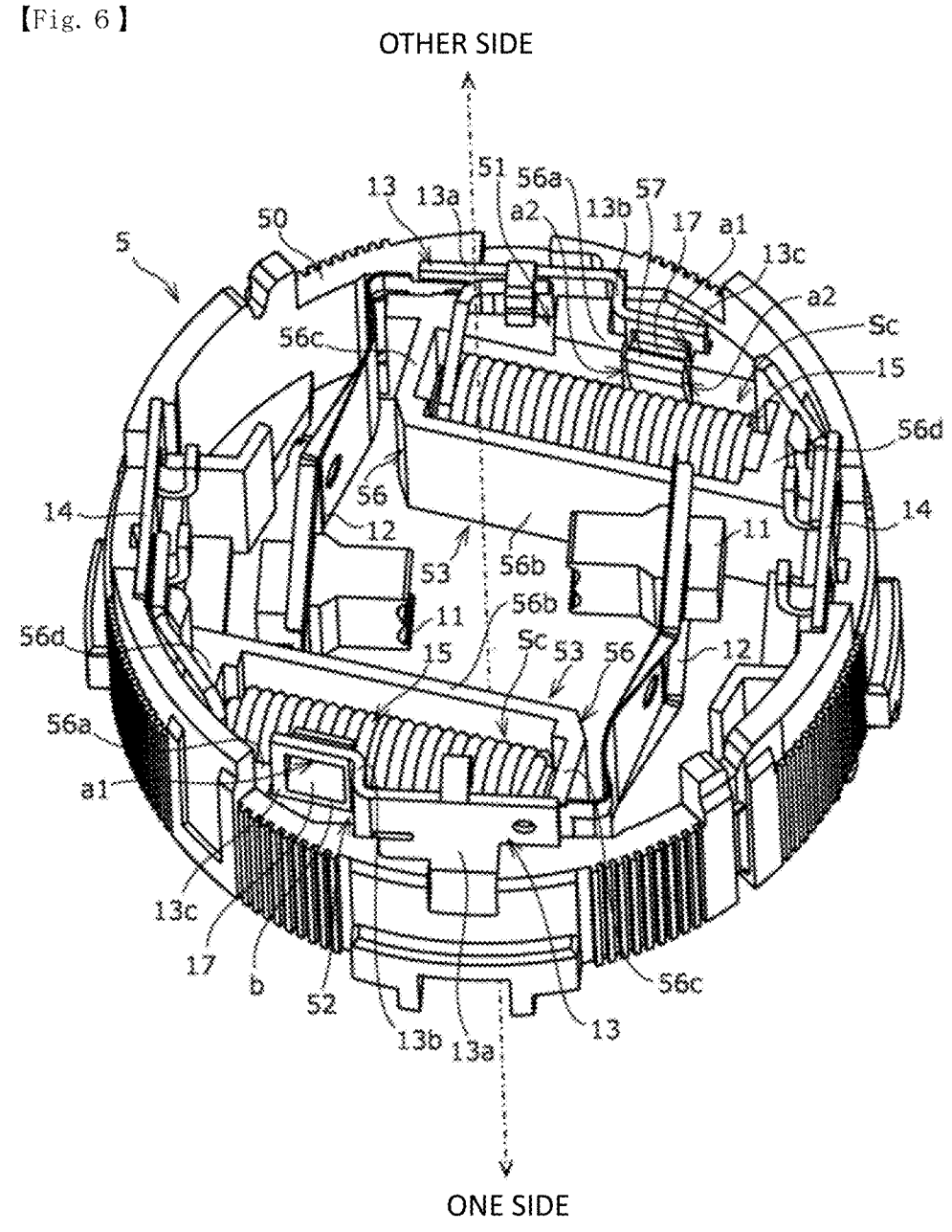
ONE SIDE

FIXING STRUCTURE OF CHOKE COIL AND MOTOR

RELATED APPLICATIONS

The present application is a National Phase of International Application Number PCT/JP2022/022666 filed Jun. 3, 2022, which claims the benefit of priority from Japanese Patent Application No. 2021-123798, filed on Jul. 29, 2021.

BACKGROUND

Technical Field

The present invention relates to a fixing structure of a choke coil electrically connected to a brush in sliding contact with a commutator, and to a motor to which the fixing structure of the choke coil is applied.

Background Art

Typically, it is known to provide a choke coil that electrically connects between a brush and a terminal in order to reduce noise generated from a sliding portion between the commutator and the brush. The choke coil may vibrate during the driving of the motor when the fixing is loose, and may cause disconnection or noise. Therefore, there has been a need to reliably fix a choke coil, and various methods are proposed.

For example, Patent Literature 1 discloses a motor including a brush held by a brush holder that is attached to a holder base and a choke coil connected to the brush, in which a choke coil is sandwiched and held between a pair of holding walls integrally formed with the holder base by a resin material. According to Patent Literature 1, by sandwiching and holding the choke coil between the pair of holding walls, there is no gap between the holding wall and the choke coil, and the noise generated by the vibration of the choke coil can be reduced.

CITATION LIST

Patent Literature

Patent Literature 1: Japanese Patent No. 5501689

DISCLOSURE OF THE INVENTION

Problems to be Solved by the Invention

By the way, since the component formed by the resin material is deformed by the influence of humidity in the atmosphere, in the configuration of the Patent Literature 1, the fixing of the choke coil can be loosened by continuing use. In addition, as a method of fixing the choke coil, a method using an adhesive may be considered instead of mechanical fixing such as a holding wall. However, the fixing method with an adhesive has many issues such as the cost of the adhesive, the need of waiting time until the adhesive is dried, and the occurrence of defects due to stringiness of the adhesive and poor coating position.

The present application has been devised in view of such issues, and is intended to mechanically fix a choke coil without using an adhesive and to maintain the fixed state for a long period of time. Note that, without being limited to this object, the effect of operation derived from each configuration shown in "DETAILED DESCRIPTION" to be described later, which has an effect that cannot be obtained by the related art, can also be positioned as another object of the present application.

Solutions to the Problems (1) A fixing structure of a choke coil disclosed here is a fixing structure of a choke coil electrically connected to a brush that is in sliding contact with a commutator and housing a ferrite core inside, the fixing structure including: a bottom surface portion where the choke coil is placed: a housing wall portion erected from the bottom surface portion and forming a first space that houses the choke coil with the bottom surface portion: an elastic portion that is formed by notching a part of the housing wall portion and capable of elastic deformation: and a pressing portion that presses the choke coil via the elastic portion by biasing the elastic portion to an inside of the first space, and fixes the choke coil between the pressing portion and the inner surface of the housing wall portion.

(2) The housing wall portion and the elastic portion are preferably made of resin, and the pressing portion is preferably made of metal.

(3) The fixing structure of a choke coil preferably includes: a second space that is provided adjacent to the first space by sandwiching a part of the housing wall portion and houses the pressing portion. In this case, the pressing portion is preferably provided separately from both of the housing wall portion and the elastic portion, and the elastic portion is preferably provided between two slits formed toward a side of the bottom surface portion from an edge portion of a part of the housing wall portion that is erected between the first space and the second space of the housing wall portion.

(4) In the elastic portion, a plate thickness on the side of the bottom surface portion is preferably thinner than a plate thickness on a side of the edge portion.

(5) The housing wall portion preferably includes a pair of side surface portions extending in an axis line direction of the choke coil in a housed state where the choke coil is housed in the first space. In this case, the elastic portion is preferably provided at a position facing an outer peripheral surface of the choke coil in one of the side surface portions in the housed state of the choke coil, the bottom surface portion and the other of the side surface portions are preferably formed in a curved surface shape along the outer peripheral surface of the choke coil, and the pressing portion preferably fixes the choke coil via the elastic portion between an inner surface of the other of the side surface portions and the bottom surface portion.

(6) The fixing structure of a choke coil preferably includes: a metal terminal housed in a third space that is provided at a position apart from the first space. In this case, the pressing portion is preferably provided at a position facing a part of the housing wall portion in the terminal in a state where the terminal is housed in the third space.

(7) In the case of (6) described above, the terminal is preferably provided with a U-shaped slit having a U shape that is opened toward the side of the bottom surface portion in the state where the terminal is housed in the third space. In this case, the pressing portion is preferably provided by a portion that is defined by the U-shaped slit, is bent and formed along a folding line connecting end portions of the U-shaped slit, and is plastically deformed.

In addition, a motor disclosed here is a motor including a stator and a rotor, the motor including: a brush that is in sliding contact with a commutator that integrally rotates with the rotor; and a choke coil that is electrically connected to the brush, in which the fixing structure of a choke coil according to any one of (1) to (7) described above is applied to the choke coil.

Effects of the Invention

The disclosed fixing structure of a choke coil and the motor, it is possible to mechanically fix a choke coil without using an adhesive and to maintain the fixed state for a long period of time.

BRIEF DESCRIPTION OF THE DRAWINGS

FIG. 1 is an axial half cross-sectional view of a motor according to an embodiment.

FIG. 2 is a front view of the end bell of the motor of FIG. 1.

FIG. 3 is a view of the end bell of FIG. 2 with a brush, a brush arm, a brush terminal, and a choke coil removed.

FIG. 4 is a perspective view of the end bell of FIG. 3.

FIG. 5 is a cross-sectional view taken along the line X-X in FIG. 2.

FIG. 6 is a perspective view of the end bell of FIG. 2.

DESCRIPTION OF PREFERRED EMBODIMENTS

Referring to the drawings, a fixing structure and a motor of a choke coil as an embodiment will be described. The embodiments below are merely exemplary and are not intended to preclude the application of various numbered modifications and techniques that are not explicitly described in the present embodiment below. Each configuration in the present embodiment can be implemented in various modifications without departing from the gist. In addition, each configuration can be selected as required or can be appropriately combined.

1. Overall Configuration

FIG. 1 is an axial half cross-sectional view of a motor 1 of the present embodiment. The motor 1 of the present embodiment is a DC motor with a permanent magnet field type brush, and has a stator 3, a rotor 4, an end bell 5, and an end plate 6. The rotor 4 is disposed in the tubular stator 3. That is, the motor 1 is a so-called inner rotor type motor. The rotor 4 is provided with a shaft 41 and rotates around a center line Lr of the shaft 41. Note that the center line Lr of the shaft 41 is also the center line of the motor 1 (rotor 4). Hereinafter, the direction in which the center line Lr extends will be referred to as the axial direction, the direction orthogonal to the center line Lr will be referred to as the radial direction, and the direction that rotates around the center line Lr will be referred to as the circumferential direction.

The stator 3 of the present embodiment has an auxiliary yoke 31, a magnet 32, and a magnet pin 33. The auxiliary yoke 31 has a bottomed tubular shape in which an opening portion 31a is formed on one side (right side in the drawing) of the center line Lr and a bottom portion 31b is provided on the other side (left side in the drawing). The circular hole portion 31c is provided in the center of the bottom portion 31b of the auxiliary yoke 31. A bearing 7 for rotatably supporting the other side of the shaft 41 is internally fitted to the hole portion 31c. A plurality of magnets 32 is provided at intervals in the circumferential direction along the inner peripheral surface of the auxiliary yoke 31. The magnet 32 is disposed at a position facing the core 42 (hereinafter referred to as a "rotor core 42") described below of the rotor 4 in a state where the rotor 4 is incorporated into the stator 3, and extends in the axial direction to surround the rotor core 42. The magnet pin 33 is provided between the auxiliary yoke 31 and the magnet 32 to fix the magnet 32 to the auxiliary yoke 31.

The rotor 4 includes the shaft 41, the rotor core 42, a winding 43, and a commutator 44. The shaft 41 is a rotation shaft that supports the rotor 4 and also functions as an output shaft that extracts the output of the motor 1 to the outside. The rotor core 42 is a stacked core in which a plurality of steel plates having the same shape are stacked. The rotor core 42 is integrally rotated with the shaft 41 that is fixed in a state in which the axial direction is aligned with the center of the rotor core 42 in the stacking direction of the steel plates. The winding 43 forms a coil by being wound around the rotor core 42, and generates a magnetic force by a current flowing. The commutator 44 is press-fitted and fixed to the outer periphery of one side of the shaft 41 (the side of the opening portion 31a than the rotor core 42), and is attached to the rotor core 42 to define a circumferential position, and rotates integrally with the rotor 4.

The end bell 5 is a member that is internally fitted into the opening portion 31a of the auxiliary yoke 31 and supports the brush 11 that is in sliding contact with the commutator 44. The end bell 5 is formed in a tubular shape (substantially cylindrical in the present embodiment) having an outer peripheral surface corresponding to the shape of the inner peripheral surface of the opening portion 31a of the auxiliary yoke 31, and is disposed coaxially with the shaft 41. On the inner side in the radial direction of the end bell 5, a space Sr (a space penetrating in the axial direction that is hereinafter referred to as "center space Sr") in which the shaft 41 and the commutator 44 are disposed is formed.

The end plate 6 is a lid member fixed to one side of the end bell 5. The end plate 6 has a hole portion 6a into which the shaft 41 is inserted and in which a bearing 8 rotatably supporting one side of the shaft 41 is internally fitted. In the motor 1 of the present embodiment, the opening portion 31a of the auxiliary yoke 31 is closed by the end bell 5 and the end plate 6, but the structure for closing the opening portion 31a is not limited to this.

FIG. 2 shows a front view of the end bell 5 seen from the other side. The end bell 5 is attached with a brush 11, a brush arm 12, a brush terminal 13 (terminal), a power supply terminal 14 (terminal), and a choke coil 15. The pair of brushes 11 is, for example, the pair of brushes mainly made of carbon, and is provided on the end bell 5. Each of the pair of brushes 11 is disposed to face each other with the center line Lr sandwiched in the radial direction in the center space Sr of the end bell 5. Although omitted in FIG. 2, the commutator 44 is disposed between the pair of brushes 11.

The brush arm 12 is a thin plate-like member having conductivity and is provided for attaching the brush 11 in the center space Sr described above. One end of the brush arm 12 is bent and joined to the brush terminal 13. The brush 11 is attached to and supported by the other end of the brush arm 12. Both the pair of brushes 11 and the pair of brush arms 12 are disposed substantially point-symmetrically with respect to the center line Lr.

The brush terminal 13, the power supply terminal 14, and the choke coil 15 are provided one by one for each of the pair of brushes 11. These components 13 to 15 are electrically connected to one brush 11 in the order of the brush terminal 13, the choke coil 15, and the power supply terminal 14. The brush terminal 13, the power supply terminal 14, and the choke coil 15 electrically connected to each of the pair of brushes 11 are also disposed substantially point-symmetrically with respect to the center line Lr. The structure and arrangement of each of the components 13 to 15 will now be described in detail. Note that, unless stated otherwise, in the following description, the components 12 to 15 electrically connected to one of the pair of brushes 11 will be described.

The brush terminal 13 is a metal terminal. The brush terminal 13 has a joint portion 13*a* formed in a crank shape in the axial view and provided at a position shifted by approximately 90 degrees clockwise with respect to the brush 11, a connection portion 13*b* continuing to the joint portion 13*a*, and an inclined portion 13*c* continuing to the connection portion 13*b*.

The joint portion 13*a* extends in a tangential direction with respect to an outer peripheral surface of the end bell 5. One end of the brush arm 12 is joined to one end (end portion on the side of the brush 11) of the joint portion 13*a*. As a result, the brush terminal 13 is electrically connected to the brush 11 via the brush arm 12. The connection portion 13*b* bends and extends from the other end of the joint portion 13*a* to a direction substantially orthogonal to the extending direction of the joint portion 13*a* (radially inward). The inclined portion 13*c* bends and extends in a direction away from the joint portion 13*a* from the end portion on the side where the joint portion 13*a* of the connection portion 13*b* is not connected. The inclined portion 13*c* of the present embodiment is slightly inclined with respect to the joint portion 13*a*, and specifically extends to be inclined radially inward as it separates from the joint portion 13*a* with respect to the extending direction of the joint portion 13*a*. Hereinafter, the direction in which the inclined portion 13*c* extends is also referred to as the "first direction" in a state where the brush terminal 13 is attached to the end bell 5.

The power supply terminal 14 is a metal terminal that receives power from an external power source. The power supplied from the external power source to the power supply terminal 14 is supplied to the winding 43 (coil) via the choke coil 15, the brush terminal 13, the brush arm 12, and the brush 11 in this order. The power supply terminal 14 is provided at a position on the radially inward position at about the same phase as the electrically non-connected (that is, another) brush 11 and extends tangentially with respect to the outer peripheral surface of the end bell 5 at that position. In other words, the power supply terminal 14 is provided at a position shifted by about 90 degrees clockwise from the joint portion 13*a* of the brush terminal 13 electrically connected, and extends in a direction orthogonal to the extending direction of the joint portion 13*a* of the brush terminal 13.

The choke coil 15 is, for example, a tubular component in which a metal wire is spirally wound. In the choke coil 15, a cylindrical ferrite core 16 is housed in a substantially coaxial arrangement. That is, the choke coil 15 may be said to be a coil wound around the ferrite core 16.

The choke coil 15 is disposed radially inward of the joint portion 13*a* of the brush terminal 13. The choke coil 15 is arranged in a manner that the direction of its axis line Lc extends in the extending direction of the inclined portion 13*c* of the brush terminal 13, that is, parallel to the first direction. One end of a wire constituting the choke coil 15 is connected to the brush terminal 13, and the other end is connected to the power supply terminal 14. As a result, the choke coil 15 reduces noise generated from a sliding portion between the brush 11 and the commutator 44.

FIG. 3 is a view with the components 11 to 13 and 15 removed from FIG. 2 (a front view of a state before these components 11 to 13 and 15 are arranged on the end bell 5 as seen from the other side), and FIG. 4 is a perspective view of the end bell 5 of FIG. 3. As shown in FIGS. 3 and 4, the end bell 5 includes a peripheral wall portion 50 forming an outer shape of the end bell 5, and three types of attachment portions 51, 52, and 53 for attaching the brush terminal 13, the power supply terminal 14, and the choke coil 15 to the positions described above on the radially inner side of the peripheral wall portion 50. The outer peripheral surface of the peripheral wall portion 50 has a shape corresponding to the shape of the inner peripheral surface of the opening portion 31*a* of the auxiliary yoke 31. The end bell 5 including the peripheral wall portion 50 and the attachment portions 51, 52, and 53 is integrally molded using a resin material.

The first attachment portion 51 for attaching the brush terminal 13 is provided at a portion where a part of the peripheral wall portion 50 is bulges radially inward. The first attachment portion 51 is provided with a groove forming a terminal housing space St (third space) capable of storing the brush terminal 13 from an end surface on the other side of the first attachment portion 51 toward one side. The groove forming the terminal housing space St forms a crank shape in an axial view corresponding to the shape of the brush terminal 13 described above. The brush terminal 13 is fitted and fixed in the terminal housing space St. Furthermore, the first attachment portion 51 is provided with a groove c communicating the terminal housing space St and the center space Sr from an end surface on the other side of the first attachment portion 51 toward one side. One end of the brush arm 12 is disposed in the groove c.

The second attachment portion 52 for attaching the power supply terminal 14 is provided at a portion where a part on one side of the peripheral wall portion 50 bulges radially inward at a position where the power supply terminal 14 described above is provided. A groove (not shown) extending in the tangential direction is provided toward one side in the second attachment portion 52, and a portion of the power supply terminal 14 is inserted and fixed in the groove.

The third attachment portion 53 for attaching the choke coil 15 includes a bottom surface portion 55 in which a portion on one side of the first attachment portion 51 extends radially inward, and a housing wall portion 56 that is erected from the bottom surface portion 55 toward the other side (that is, in the axial direction). As shown in FIG. 3, the bottom surface portion 55 of the present embodiment is widely provided between the second attachment portion 52 and the vicinity of the end portion of the brush terminal 13 that is fitted into the first attachment portion 51 on the opposite side from the end portion of the brush terminal 13 on side of the brush 11. The choke coil 15 is placed on the bottom surface portion 55. The bottom surface portion 55 is provided corresponding to the arrangement of the choke coil 15 described above, and is formed in a substantially rectangular shape having a long side extending in the first direction when seen in the axial direction.

The housing wall portion 56 is a wall portion surrounding the periphery of the choke coil 15 placed on the bottom surface portion 55. A portion of the first attachment portion 51 that is radially inward than the terminal housing space St is included in the housing wall portion 56. The bottom surface portion 55 and the housing wall portion 56 form a choke coil housing space Sc (first space) in which the choke coil 15 is housed in the third attachment portion 53. The choke coil housing space Sc is provided apart from the terminal housing space St of the first attachment portion 51, and is adjacent to a portion of the terminal housing space St where the inclined portion 13c of the brush terminal 13 is positioned.

As shown in FIG. 2, in a state where the choke coil 15 is housed in the choke coil housing space Sc (hereinafter referred to as "housed state"), the housing wall portion 56 has two side wall portions 56a and 56b (side surface portions) extending in the direction of an axis line Lc (first direction) of the choke coil 15, and two end wall portions 56c and 56d extending perpendicular to the direction of the axis line Lc of the choke coil 15 and facing the end portion in the direction of the axis line Lc of the choke coil 15. That is, the housing wall portion 56 of the present embodiment is formed in a substantially rectangular shape when seen in the axial direction.

The distance between the two side wall portions 56a and 56b is set longer than the outer diameter dimension of the choke coil 15. Therefore, in a case where the choke coil 15 is not fixed by an elastic portion 57 and a pressing portion 17 described below in the housed state, a slight gap is formed between at least one of the side wall portions 56a and 56b and the choke coil 15. In addition, the distance between the two end wall portions 56c and 56d is equal to the length of the ferrite core 16 in the direction of the axis line Lc. As a result, the end wall portions 56c and 56d abut on the ferrite core 16 and restricts the position of the choke coil 15 in the direction of an axis line Lc. The outer wall portion 56a positioned radially outward of the two side wall portions 56a and 56b is formed by a portion radially inward of the terminal housing space St of the first attachment portion 51.

FIG. 5 is a cross-sectional view taken along the line X-X in FIG. 2. As shown in FIG. 5, the bottom surface portion 55 and the inner wall portion 56b positioned radially inward of the two side wall portions 56a and 56b are formed into a smooth curved surface (continuous surface without a step and the like) along the outer peripheral surface of the choke coil 15. In the present embodiment, a portion of the outer wall portion 56a on the side of the bottom surface portion 55 is similarly formed into a smooth curved surface along the outer peripheral surface of the choke coil 15. Note that, in FIG. 5, hatching indicating a cross section of the choke coil 15 and the ferrite core 16 is omitted.

2. Configuration of Main Portions

FIG. 6 is a perspective view of the end bell 5 of FIG. 2. In FIG. 6, from the viewpoint of making the structure of the brush terminal 13 and the pressing portion 17 described below easily visible, a state in which one of the pair of brushes 11 (the brush 11 on the lower side of the plane of paper) and the brush arm 12 and the brush terminal 13 connected to this are partially pulled out to the other side (state before the arrangement is completed) is shown.

The choke coil 15 may vibrate during the driving of the motor 1 when the fixing is loose, and may cause disconnection or noise. In addition, even in a case where choke coil 15 is firmly fixed at the beginning of assembly (when the motor 1 is completed), its fixation can be loosened by continuous use. Therefore, it is required that the choke coil 15 continues to be firmly fixed to the end bell 5 even while continuous use.

Therefore, in the choke coil fixing structure of the present embodiment, as shown in FIGS. 3 and 4, as a structure for maintaining the fixed state of the choke coil 15 for a long period of time, the choke coil fixing structure includes an elastically deformable elastic portion 57 formed by notching a part of the housing wall portion 56 described above, and a pressing portion 17 for biasing the elastic portion 57 to the inside of the choke coil housing space Sc. In the present fixing structure, as shown in FIGS. 2 and 5, the pressing portion 17 biases the elastic portion 57 to the inside of the choke coil housing space Sc. Thus, the choke coil 15 is pressed via the elastic portion 57, and the choke coil 15 is firmly fixed between the pressing portion 17 and the inner surface of the housing wall portion 56.

As shown in FIGS. 5 and 6, the pressing portion 17 of the present embodiment is provided on the inclined portion 13c of the brush terminal 13. That is, the pressing portion 17 is provided separately from both of the housing wall portion 56 and the elastic portion 57. The brush terminal 13 is provided with a U-shaped slit a1 having a U shape that is opened toward the side (one side) of the bottom surface portion 55 in a state where the brush terminal 13 is housed in the terminal housing space St. The portion defined by the U-shaped slit a1 is bent and formed toward the inside (radially inward) of the choke coil housing space Sc along the folding line b (see FIG. 5) connecting the end portions of the U-shaped slit a1, and is plastically deformed. Thus, the pressing portion 17 is provided. Note that, although the corner portion of the U-shaped slit a1 of the present embodiment is square, the corner portion may be arc-shaped.

As described above, since the brush terminal 13 is housed in the terminal housing space St of the first attachment portion 51, it can be said that the terminal housing space St includes a space that houses the pressing portion 17 as shown by adding a dot pattern to FIG. 3. Hereinafter, the portion of the terminal housing space St where the pressing portion 17 is positioned when the brush terminal 13 is housed in the terminal housing space St is referred to as a pressing portion housing space Sp (second space). Since the portion of the terminal housing space St where the inclined portion 13c of the brush terminal 13 is adjacent to the choke coil housing space Sc, the pressing portion housing space Sp is also adjacent to the choke coil housing space Sc.

The elastic portion 57 is provided on a part of the outer wall portion 56a. More specifically, the elastic portion 57 is provided at a portion of the outer wall portion 56a that is erected between the choke coil housing space Sc and the pressing portion housing space Sp. That is, it can be said that the pressing portion housing space Sp described above is provided adjacent to the choke coil housing Space Sc with the elastic portion 57 sandwiched.

The elastic portion 57 is provided at a position of the outer wall portion 56a facing the outer peripheral surface of the choke coil 15 in the housed state. As shown in FIG. 6, a part of the outer wall portion 56a is provided with two slits a2 formed from an edge portion on the other side of the outer wall portion 56a toward the side of the bottom surface portion 55. The elastic portion 57 is provided between the two slits a2 and faces the outer peripheral surface of the choke coil 15 in the housed state.

As shown in FIG. 5, a portion (hereinafter referred to as a "base end portion") on the side of the bottom surface portion 55 of the elastic portion 57 is connected to the first attachment portion 51. As a result, the elastic portion 57 is configured to be elastically deformable to the inside of the choke coil housing space Sc with the base end portion as a base point. More specifically, the elastic portion 57 is configured to be elastically deformable toward the inside and the side of the bottom surface portion 55 of the choke coil housing space Sc (that is, in an oblique direction with respect to the axial direction).

When the choke coil 15 is housed in the choke coil housing space Sc and the brush terminal 13 is housed in the terminal housing space St, the pressing portion 17 abuts on the elastic portion 57 to elastically deform the elastic portion 57 to the inside of the choke coil housing space Sc. As a result, the choke coil 15 is biased radially inward and adheres to the curved inner surface of the inner wall portion 56b and the bottom surface portion 55 positioned diagonally across the axis line Lc of the choke coil 15.

The elastic portion 57 of the present embodiment is recessed in a manner that the base end portion (specifically, the surface on the side of the choke coil housing space Sc) slightly protrudes radially outward. Specifically, the elastic portion 57 is formed in a manner that the plate thickness on the side of the bottom surface portion 55 is thinner than the plate thickness on the edge portion side (other side). This makes it easier to perform elastic deformation with the base end portion on the side of the bottom surface portion 55 as a base point. Note that the plate thickness of the elastic portion 57 may be formed to gradually change in the standing direction of the outer wall portion 56a, a taper may be provided in the middle of the standing direction, and the plate thickness on the side of the bottom surface portion 55 and the plate thickness on the edge portion side may be constant, respectively.

3. Actions and Effects (1) In the fixing structure of the choke coil 15 described above and the motor 1 to which this fixing structure is applied, since the choke coil 15 is mechanically fixed without using an adhesive when the choke coil 15 is fixed, the failure due to the stringiness of the adhesive or the failure of the coating position can be eliminated in the production process, and the defect rate can be lowered. Furthermore, it is possible to reduce the cost price of the motor 1, reduce the waiting time until the adhesive is dried, and reduce the inspection cost of the adhesive coating state.

In the fixing structure and the motor 1 described above, the pressing portion 17 that biases the elastic portion 57 to the inside of the choke coil housing space Sc is provided, and the pressing portion 17 presses the choke coil 15 via the elastic portion 57. This causes the pressing portion 17 to always apply a biasing force that causes the elastic portion 57 to elastically deform to the inside of the choke coil housing space Sc. Therefore, even if the elastic portion 57 is deformed by the humidity change in the atmosphere or use for a long period of time, the choke coil 15 can be continuously fixed by the biasing force of the pressing portion 17.

That is, compared with a typical structure in which a choke coil is fixed by a protective wall integrally formed with a holder base, for example, Patent Literature 1, since the choke coil 15 is fixed by the elastic portion 57 formed by notching a part of the housing wall portion 56 and the pressing portion 17 for biasing the elastic portion 57, the choke coil 15 can be firmly fixed, and the fixed state can be maintained for a long period of time. Furthermore, it is possible to decrease a failure such as disconnection of the electrically connected portion (for example, a soldered portion) between the choke coil 15 and the brush terminal 13 and generation of abnormal noise due to vibration of the choke coil 15. Thus, the fixing reliability can be improved.

(2) Furthermore, the choke coil 15 can be stably fixed for a long period of time without being affected by aging of the resin or deformation due to humidity by pressing the choke coil 15 via the elastic portion 57 by the pressing portion 17 made of metal.

(3) The elastic portion 57 is provided between the two slits a2 formed toward the side of the bottom surface portion 55, in a manner that the other end portion of the elastic portion 57 is elastically deformed toward the inside of the choke coil housing space Sc and the side of the bottom surface portion 55. This causes the choke coil 15 to be pressed against the inner surfaces of the housing wall portion 56 and the bottom surface portion 55, in a manner that the choke coil 55 is less likely to fall out of the choke coil housing space Sc. Thus, the choke coil 15 can be more reliably fixed.

Furthermore, since the pressing portion 17 is provided separately from the housing wall portion 56 and the elastic portion 57, the pressing portion 17 can be realized by a high-strength component compared with the housing wall portion 56 and the elastic portion 57, and the degree of freedom of design increases. In addition, since the they are separate bodies, the configuration around the housing wall portion 56 and the elastic portion 57 and the configuration of the pressing portion 17 can be simplified.

In addition, since the pressing portion 17 can be inserted after the choke coil 15 is inserted into the choke coil housing space Sc, the assembly can be facilitated. In a case where the pressing portion 17 is inserted later, the elastic portion 57 is not biased to the inside of the choke coil housing space Sc when the choke coil 15 is inserted. Therefore, the operation of pushing the choke coil 15 while bringing the choke coil 15 into contact with the housing wall portion 56 or the elastic portion 57 is not required, and the choke coil 15 can be easily housed. The choke coil 15 can thereby avoid being damaged when the choke coil 15 is inserted.

(4) The elastic portion 57 is formed in a manner that the plate thickness of the side of the bottom surface portion 55 (that is, the side of the base end portion) of the elastic section 57 is formed thin. Therefore, it is easily elastically deformed and the choke coil 15 can be pressed more stably.

(5) The inner wall portion 56b and the bottom surface portion 55 positioned on the opposite side of the elastic portion 57 are formed in a curved surface shape along the outer peripheral surface of the choke coil 15. In addition, the elastic portion 57 is provided at a position facing the outer peripheral surface of the choke coil 15 in the outer wall portion 56a. Thus, in the fixed state of the choke coil 15, the outer peripheral surface of the choke coil 15 and the bottom surface portion 55 and the inner wall portion 56b can be brought into close contact with each other, and can be more reliably fixed.

(6) The pressing portion 17 is provided in the brush terminal 13. Thus, by using the brush terminal 13 that has been typically used, addition of a new component is not required, and a large design change and an increase in the number of parts can be avoided to improve the fixing reliability.

(7) In addition, the portion defined by the U-shaped slit a1 of the brush terminal 13 is bent and formed along the folding line b connecting the end portions of the U-shaped slit a1, and is plastically deformed. Thus, the pressing portion 17 is provided. For this reason, the pressing portion 17 functions like a leaf spring when housed in the terminal housing space St, and can maintain an appropriate pressing force. Therefore, the choke coil 15 can be reliably fixed without applying excessive load to the elastic portion 57 or the choke coil 15.

4. Other

The configuration of the fixing structure of the choke coil and the motor described in the above embodiment are examples, and are not limited to those described above. The pressing portion 17 may not have a portion defined by the U-shaped slit a1 provided in the inclined portion 13*c* that is bent and formed. For example, the pressing portion 17 may be provided by projecting a part of the radially inner surface of the inclined portion 13*c* radially inward, and may be provided by recessing the inclined portion 13*c* radially inward from the outside in the radial direction in a manner that the portion projects radially inward. In addition, the pressing portion 17 may be provided at a terminal other than the brush terminal 13. For example, in a case where the choke coil 15 is provided adjacent to the power supply terminal 14, the pressing portion 17 may be provided in the power supply terminal 14. In addition, the terminal provided with the pressing portion 17 may not be electrically connected to the choke coil 15 pressed by the pressing portion 17.

The position of the elastic portion 57 is not limited to the position described above, and the elastic portion 57 may be provided at another position facing the outer peripheral surface of the choke coil 15. For example, in a case where the elastic portion 57 is provided at a position near the center or the center of the choke coil 15 in direction of the axis line Lc, the center portion of the choke coil 15 in the direction of the axis line Lc can be pressed. Therefore, the fixing reliability of the choke coil 15 can be further enhanced. In addition, the elastic portion 57 may also be provided on the inner wall portion 56*b*. In this case, the bottom surface portion 55 and the outer wall portion 56*a* facing the inner wall portion 56*b* are preferably formed in a curved surface shape along the outer peripheral surface of the choke coil 15.

The elastic portion 57 may be provided on the end wall portions 56*c* and 56*d*. In addition, the plurality of elastic portions 57 may be provided for one choke coil 15. For example, the elastic portion 57 may be provided on both of the outer wall portion 56*a* and the inner wall portion 56*b*, or the plurality of elastic portions 57 may be provided on at least one of the outer wall portion 56*a* and the inner wall portion 56*b*. In this case, the pressing portion may be provided according to the number of the elastic portions. In a case where each wall portion is provided with a plurality of elastic portions, a pressing portion that biases the plurality of elastic portions may be provided as one member.

The shape of the third attachment portion 53 is not limited to the one described above. The housing wall portion 56 of the third attachment portion 53 is not limited to a substantially rectangular shape when seen in the axial direction, and may be, for example, an elliptical shape that is long in the direction of the axis line Lc of the choke coil 15. The bottom surface portion 55 and the side wall portions 56*a* and 56*b* may not be connected in a smooth curved surface shape. In addition, the shapes of the first attachment portion 51 and the second attachment portion 52 are not limited to those described above.

The elastic portion 57 may be configured in a manner that the side of the end portion projects radially inward instead of a configuration in which the base end portion is recessed radially outward. The surface on the side of the choke coil housing space Sc of the elastic portion 57 may have a curved surface shape along the outer peripheral surface of the choke coil 15. In this case, the choke coil 15 can be more firmly fixed because the elastic portion 57 is in closer contact with the choke coil 15. Note that the plate thickness of the elastic portion 57 may be uniform in its standing direction of the housing wall portion 56.

The pressing portion may be provided as a separate member from the terminal (brush terminal 13 or power supply terminal 14). For example, the pressing portion may include a triangular wedge-shaped member or member having a threaded tip end. In a case where the pressing portion is provided as a member that is different from the terminal, the second space that houses the pressing portion may be provided separately from the third space that houses the terminal.

The pressing portion may be made of not only metal but also other materials. For example, the pressing portion may be made of a hard rubber. In a case where the pressing portion is made of another material, the pressing portion is preferably made of a material having a higher strength than the materials of the housing wall portion and the elastic portion. By making the pressing portion with a high-strength material, the deformation of the pressing portion due to the reaction force of the elastic portion is reduced. Therefore, the choke coil can be more firmly fixed for a long period of time. Note that the pressing portion may be made of resin. In this case, the pressing portion may be made of the same resin material as the materials of the housing wall portion and the elastic portion, or may be made of a resin material having higher strength and higher hardness than the materials of the housing wall portion and the elastic portion.

The pressing portion may be integrally formed with the housing wall portion and the elastic portion. That is, the pressing portion may be provided as a part of the end bell 5. For example, the pressing portion may be configured to bias the elastic portion to the inside of the first space (the space corresponding to the choke coil housing space Sc described above) by bending a part of the end bell 5 after the end bell 5 is molded. Alternatively, the pressing portion may be configured by thermally deforming a part of the end bell 5 to bias the elastic portion to the inside of the first space.

The shape of the notch (slit a2) provided on the outer wall portion 56*a* is not limited to the one described above. For example, the notch provided on the outer wall portion 56*a* may be L-shaped. That is, the elastic portion may be formed by a single notch having a portion extending in the standing direction of the outer wall portion 56*a* and a portion bent from the portion and extending parallel to the direction of the axis line Lc of the choke coil 15. In this case, the choke coil 15 is pressed against the inner surface of the inner wall portion 56*b*.

The positions of the brush 11, the brush arm 12, the brush terminal 13, the power supply terminal 14, and the choke coil 15 are examples. For example, the choke coil 15 may be arranged in a manner that the direction of its axis line Lc is in parallel with the axial direction of the motor 1. In addition, the shape of the end bell 5 is not limited to tubular. For example, the end bell 5 may be a lid-like member that closes the opening portion 31*a* of the auxiliary yoke 31. The fixing structure described above may be provided at a position where the choke coil is housed, and may be provided in a component other than the end bell 5.

The invention claimed is:

1. A fixing structure of a choke coil electrically connected to a brush that is in sliding contact with a commutator and housing a ferrite core inside, the fixing structure comprising:

a bottom surface portion where the choke coil is placed;

a housing wall portion erected from the bottom surface portion and forming a first space that houses the choke coil with the bottom surface portion;

an elastic portion that is formed by notching a part of the housing wall portion and capable of elastic deformation;

a pressing portion that presses the choke coil via the elastic portion by biasing the elastic portion to an inside of the first space, and fixes the choke coil between the pressing portion and an inner surface of the housing wall portion; and a metal terminal housed in a third space that is provided at a position apart from the first space, wherein the pressing portion is provided at a position facing a part of the housing wall portion in the terminal in a state where the terminal is housed in the third space.

2. The fixing structure of a choke coil according to claim 1, wherein the housing wall portion and the elastic portion are made of resin, and the pressing portion is made of metal.

3. The fixing structure of a choke coil according to claim 1 comprising:

a second space that is provided adjacent to the first space by sandwiching a part of the housing wall portion and houses the pressing portion, wherein the pressing portion is provided separately from both of the housing wall portion and the elastic portion, and the elastic portion is provided between two slits formed toward a side of the bottom surface portion from an edge portion of a part of the housing wall portion that is erected between the first space and the second space of the housing wall portion.

4. The fixing structure of a choke coil according to claim 3, wherein in the elastic portion, a plate thickness on the side of the bottom surface portion is thinner than a plate thickness on a side of the edge portion.

5. A fixing structure of a choke coil according to claim 3, wherein the housing wall portion includes a pair of side surface portions extending in an axis line direction of the choke coil in a housed state where the choke coil is housed in the first space, the elastic portion is provided at a position facing an outer peripheral surface of the choke coil in one of the side surface portions in the housed state of the choke coil, the bottom surface portion and the other of the side surface portions are formed in a curved surface shape along the outer peripheral surface of the choke coil, and the pressing portion fixes the choke coil via the elastic portion between an inner surface of the other of the side surface portions and the bottom surface portion.

6. A fixing structure of a choke coil according to claim 1, wherein the terminal is provided with a U-shaped slit having a U shape that is opened toward the side of the bottom surface portion in the state where the terminal is housed in the third space, and the pressing portion is provided by a portion that is defined by the U-shaped slit, is bent and formed along a folding line connecting end portions of the U-shaped slit, and is plastically deformed.

7. A motor including a stator and a rotor, the motor comprising:

a brush that is in sliding contact with a commutator that integrally rotates with the rotor; and a choke coil that is electrically connected to the brush, wherein the fixing structure of a choke coil according to claim 1 is applied to the choke coil.

* * * * *